C. W. PATTON.
Grain Drill.
No. 82,026.  
Patented Sept. 8, 1868.
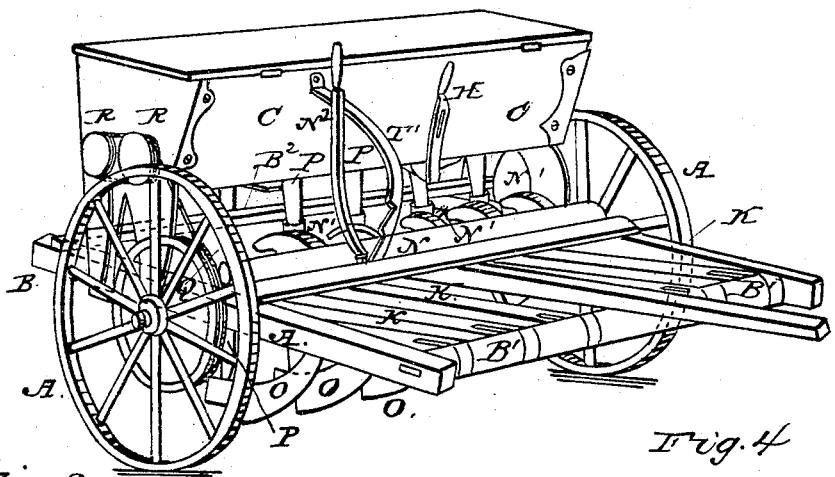
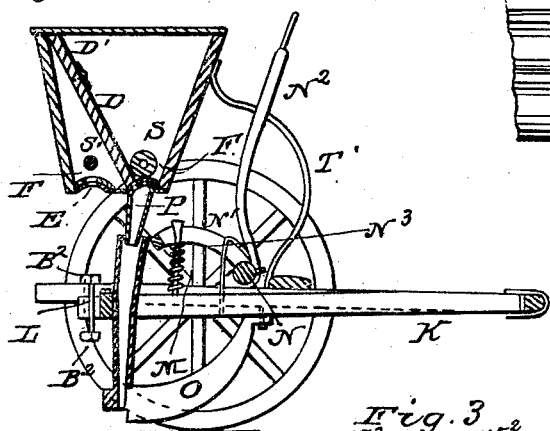
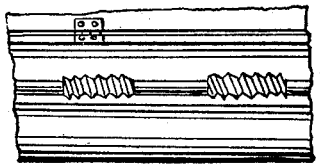
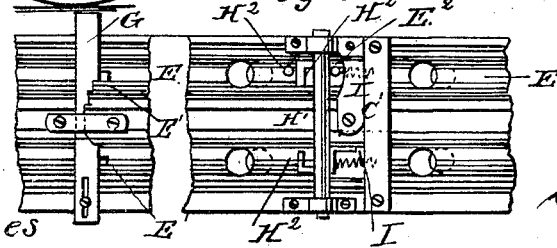
Witnesses  
Chas. T. Clausen  
P. H. Sprague
Inventor  
Chas. W. Patton  
by  
O. P. Holloway & Co.  
his Attys
N. PETERS, Photo-Lithographer, Washington, D. C.

United States Patent Office.

CHARLES W. PATTON, OF EXETER, ILLINOIS.

Letters Patent No. 82,026, dated September 8, 1868.

IMPROVEMENT IN WHEAT-DRILLS.

The Schedule referred to in these Letters Patent and making part of the same.

TO ALL WHOM IT MAY CONCERN:

Be it known that I, CHARLES W. PATTON, of Exeter, in the county of Scott, and State of Illinois, have invented a new and useful Improvement in Seed-Drills and Grass-Seed Sowers; and I do hereby declare that the following is a full, clear, and exact description of the same, reference being had to the annexed drawings, making part of this specification, in which—

Figure 1 is a perspective view,
Figure 2 is a vertical section,
Figure 3 is a plan of the bottom of the hopper, and
Figure 4 is a plan of the inside of the hopper.

The same letters are employed in the different figures in the designation of the same parts.

The drill is carried upon two wheels, A A, the spindles of which are attached to the frame B.

C is the seed-hopper, which is divided by a transverse partition, D, into two compartments, one to contain the grain to be sowed, the other for grass-seed. The door D', in the top of the partition, gives access to the grass-seed box.

The quantity of seed to be sown is regulated by means of two concavo-convex plates, E and F, in the bottom of the hopper. The upper plate, F, is permanent; the lower one, E, slides longitudinally. Round holes are formed in each, which correspond with one another in position when the slide is arranged to give the maximum discharge.

The quantity of grain to be discharged is regulated by sliding the plate E, so that part of the opening through the upper plate may be covered by the lower plate. The extent of this movement may be regulated by means of the key G, shown in fig. 3. It is formed with a series of notches to receive the projection E'. The quantity of seed sown on each acre with the orifices opened to any given extent being ascertained, may be marked on the key opposite the appropriate notch, and the drill be thus graduated to the amount of work intended to be done.

The sliding plate E is actuated by a lever, H, attached to the shaft $H^1$, extending across and having its journal-bearings on the bottom of the hopper.

On this shaft are hooks, $H^2$, which bear against projections $E^2$ on the sliding plate.

Spiral springs, I, are placed so that, bearing against the cross-piece C', their opposite ends shall press against projections on the sliding plate, and force it constantly against the graduated key. The lever and shaft are thus used to draw the plate back in closing the holes, the spring retaining the plate in contact with the key, when the apertures are properly regulated.

The box is so constructed that it may be reversed between the end plates, end for end, so as to sow grass-seed either behind or in front of the cutters.

The drag-bars K are fastened by straps to round bearings on the front piece $B^1$ of the frame in such manner as to allow to them a vertical oscillation. Notches are cut in the rear ends of the drag-bars to receive vertical guide-rods L, placed between the parallel end-pieces $B^2$ $B^2$, in rear of the frame, said rods maintaining the drag-bars in vertical movement.

Rods M are attached to the top of the drag-bars, surrounded by spiral springs, which, pressing against the slotted segments $N^1$, force the cutters O into the ground. These segments are attached to a shaft, N, turned by a lever, $N^2$, which is held in any required position by a segment, T'. By this lever the cutters may be raised by means of the cords $N^3$ above the ground, or brought into action on commencing work.

The seed-tube P receives the seed from the seed-box through pipes arranged to permit the rise and fall of the drag-bars and cutters.

The pulley Q on the wheel gives motion to a belt, which, driving the pulleys R R, turns the stirrers S S'. The stirrer S, in the seed-compartment of the hopper, is a shaft, having at intervals screw-threads projecting over that part of said shaft immediately above the seeding-holes. The intermediate parts are smooth and cylindrical. By this means dirt mixed with the wheat will be thrown past the holes to smooth part of the shaft, where it will remain.

What I claim as my invention, and desire to secure by Letters Patent, is—

1. The hopper, divided into compartments by the partition D and door D', substantially as and for the purpose set forth.

2. In combination with the perforated plates E and F, the graduated key G, for regulating the amount of grain to be sown, substantially as set forth.

3. The combination of the lever H, shaft $H^1$, arms $H^2$, and the sliding plate E with projection $E^2$, substantially as and for the purpose set forth.

4. The combination of the sliding plate E, key G, stop $E^1$, and springs I, arranged to operate substantially as described.

5. In combination with the cutters O and drag-bars K, the springs on the rods M, segments $N^1$, shaft N, and lever $N^2$, and cord $N^3$, for raising the cutters and forcing them into the ground, substantially as set forth.

6. The combination of the frame, the drag-bars, the rear frame, and vertical guide-rods L, arranged substantially as set forth.

In testimony whereof, I have signed my name to this specification in the presence of two subscribing witnesses.

CHARLES W. PATTON.

Witnesses:
GEORGE I. BERGEN,
JOHN M. WENDERKEN.